United States Patent
Dietz et al.

(10) Patent No.: US 8,291,773 B2
(45) Date of Patent: Oct. 23, 2012

(54) ULTRASONIC MEASUREMENT OF FLOW VELOCITY

(75) Inventors: Toralf Dietz, Dresden (DE); Lars Oehmichen, Dresden (DE); John Lansing, Houston, TX (US)

(73) Assignee: Sick Engineering GmbH, Ottendorf-Okrilla (DE)

( * ) Notice: Subject to any disclaimer, the term of this patent is extended or adjusted under 35 U.S.C. 154(b) by 134 days.

(21) Appl. No.: 12/907,353

(22) Filed: Oct. 19, 2010

(65) Prior Publication Data

US 2012/0090404 A1    Apr. 19, 2012

(30) Foreign Application Priority Data

Oct. 19, 2010    (EP) .................................... 10187973

(51) Int. Cl.
*G01F 1/66*    (2006.01)
(52) U.S. Cl. .................................... 73/861.31
(58) Field of Classification Search ............... 73/861.31, 73/861.27
See application file for complete search history.

(56) References Cited

U.S. PATENT DOCUMENTS

| | | | | |
|---|---|---|---|---|
| 3,940,985 A * | 3/1976 | Wyler | ......................... | 73/861.31 |
| 4,102,186 A * | 7/1978 | Brown | ......................... | 73/861.27 |
| 4,300,401 A * | 11/1981 | Pedersen | .................... | 73/861.31 |
| 4,646,575 A * | 3/1987 | O'Hair et al. | .............. | 73/861.31 |
| 5,962,790 A | 10/1999 | Lynnworth et al. | | |
| 6,474,174 B2 * | 11/2002 | Su | ............................. | 73/861.31 |
| 6,837,113 B1 | 1/2005 | Freund, Jr. et al. | | |
| 2005/0066744 A1 | 3/2005 | Kupnik et al. | | |
| 2010/0152580 A1 | 6/2010 | Ganshorn | | |

FOREIGN PATENT DOCUMENTS

| | | |
|---|---|---|
| DE | 4430223 A1 | 3/1995 |
| EP | 0984250 A1 | 3/2000 |

OTHER PUBLICATIONS

European Search Report, EP 10 18 7973, mailed on Apr. 21, 2011.

* cited by examiner

*Primary Examiner* — Jewel V Thompson
(74) *Attorney, Agent, or Firm* — Nath, Goldberg & Meyer; Jerald L. Meyer; Robert T. Burns

(57) ABSTRACT

An ultrasonic measurement device (10) for determining a flow velocity of a fluid in a conduit comprises
a pipe section (12) having a central longitudinal axis (22) and a cross section (24) with a radius (R), the central longitudinal axis (22) defining a horizontal reference plane (26);
at least a first two-path measurement system with a first path (30a) and a second path (30b) defined by a first pair of ultrasonic transducers (32) and a second pair of ultrasonic transducers (32) mounted to the wall of the pipe section (12), the ultrasonic transducers (32) of each path (30a-b) opposing each other at the ends of their path (30a-b), each path (30a-b) oriented parallel to the horizontal reference plane (26) with a distance to the horizontal reference plane (26) while having a component transverse to the central longitudinal axis (22);
first evaluation means (38) to determine a first flow velocity value from the first path (30a) by comparing the ultrasonic transit times along the first path (30a) with and against the fluid flow and a second flow velocity value from the second path (30b) by comparing the ultrasonic transit times along the second path (30b) with and against the fluid flow; and
first integration means (40) to determine the flow velocity from the first flow velocity value and the second flow velocity value.
The distance from the paths (30a-b) to the horizontal reference plane (26) is greater than half the radius (R).

15 Claims, 6 Drawing Sheets

ULTRASONIC MEASUREMENT OF FLOW VELOCITY

The invention relates to an ultrasonic measurement device and a method for determining a flow velocity of a fluid in a conduit according to the preamble of claims 1 and 12, respectively.

A common application for the measurement of flow velocities is represented by gas meters for natural gas pipelines. Usually, one is not primarily interested in the flow velocity, but in the gas volume conveyed, but this can easily be calculated with help of the known cross section of the pipeline.

Along the supply chain of natural gas, one important part is the so-called upstream field including the fields of production, processing and re-injection. Several metering points exist and have to deal with changing volume flow, wet gases and a generally rough environment. Measurements are used for reservoir management, surveillance and control of production, at gathering pipelines combining gas flow from different sources, and for accounting.

The common approach for these upstream measurement applications are orifice meters. These are comparably simple mechanical devices using pressure sensors on both sides of the orifice in order to estimate the flow. The settings for orifice meters are defined by extensive standards, like ISO5167 or AGA3, defining, among others, the necessary length of a feed portion which may extend to as much as 40-50 nominal diameters. Orifice meters are robust and inexpensive, and they can also be calibrated on the basis of their geometry alone.

On the other hand, orifice meters lack precision and diagnostics, especially when measuring conditions are unexpected. For example, the liquid part of a wet gas cannot be recognized. Orifice meters sometimes are seen as tolerant of liquid in the gas stream. This only holds true as far as damages to the meter are concerned and might be called an advantage over turbines, rotary or other traditional measurement devices. Nevertheless, orifice meters show substantial measurement errors with wet gas even when the liquid portion is low. Orifice meters are very sensitive to disturbances upstream of the meter and need a considerable portion of straight upstream piping, preferably in combination with a flow conditioner. They have low measurement dynamics, necessitating exchange of the meter to adapt to changes of flow over a source's lifetime. Finally, orifice meters require a precise geometry at edges and chamfers which will be compromised by corrosion, erosion and deposits.

Another known approach for determining flow velocities in pipelines and conduits is ultrasound measurement technology using the transit time difference method. They are widespread in the fields of transmission and storage, but not used in the upstream field because they are seen to be more costly than orifice meters.

Figure 11:
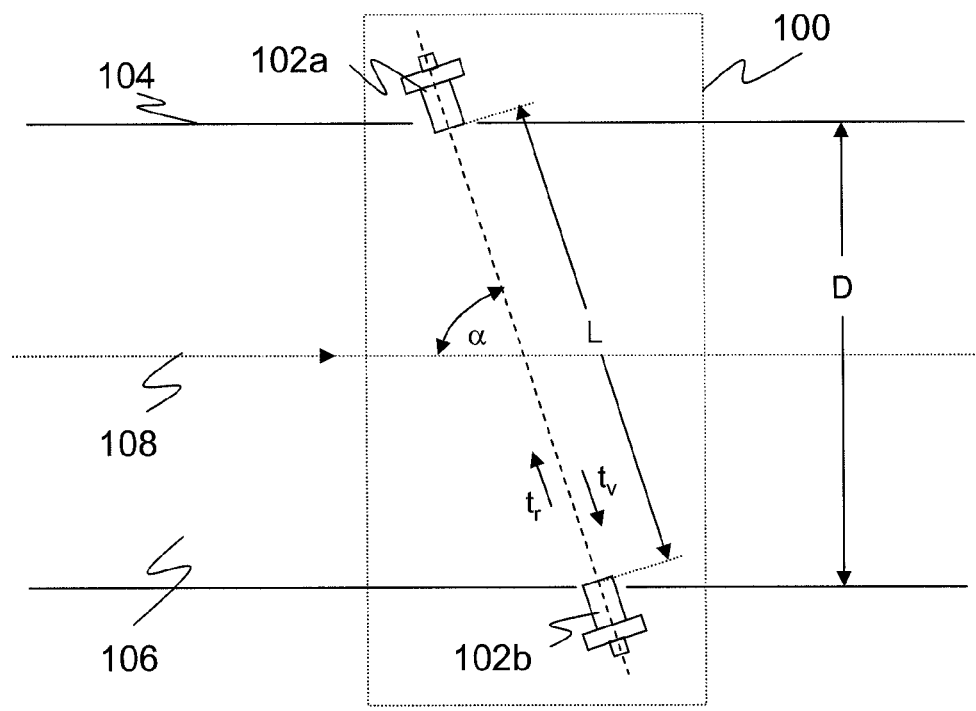

The ultrasonic transit time difference method is shown in FIG. 11. In the conventional measurement apparatus 100, two ultrasonic transducers 102a, 102b are arranged at an angle in the wall of a conduit or piping 104 in which a fluid 106 flows in the direction of the arrow 108 marking a central longitudinal axis of the piping 104. Ultrasonic pulses are transmitted and received on the measurement path between the ultrasonic transducers 102a-b, with the ultrasonic transducers 102a-b operating alternately as transmitter and receiver. The ultrasonic signals transported through the fluid are accelerated in the flow direction and decelerated against the flow direction. The resulting transit time difference is calculated using geometrical parameters as a flow velocity of the fluid along the ultrasonic path. Together with the cross-sectional area, the operating volume flow results from this which is the measurement variable of interest with a fluid billed by volume, for example. The geometrical relationships are described by the following variables:

v: flow velocity of the fluid in the piping
L: length of the measurement path between the two ultrasonic transducers
α: angle at which the ultrasonic transducers transmit and receive
Q: volume flow
D: diameter of the line
$t_v$: transit time of the ultrasound with the flow
$t_r$: transit time of the ultrasound against the flow The following relationships result from this for the target variables v and Q:

$$v = L/(2 \cos \alpha)(1/t_v - 1/t_r) \text{ and}$$

$$Q = v \cdot \frac{1}{4} D^2 \pi$$

The local, mean flow velocity at the position of the measurement path is determined in this manner. However, this only produces a precise measured value for a uniform flow. In other words, the flow velocity is only approximated with the measuring path being a single sampling point. In order to obtain a better approximation in cases of non uniform flow, the number of measurement paths and, thus, of sampling points can be increased. The resulting ultrasonic meters are known as two-path meters, four-path meters and the like. Obviously, not only precision, but also manufacturing costs for the meter are increasing with the number of measuring paths. A series of measurement path configurations or layouts are presented in the standard ISO 17089-1.

A reasonable balance of manufacturing costs and precision for upstream applications can be achieved with a two-path meter. The conventional path layout of a two-path meter consists of two parallel paths, one in the lower and one in the upper half of the piping, with a distance of 0.5 R to the central longitudinal axis in units R of the radius of the piping. This distance minimizes the approximation error according to Tschebyscheff's theorem. However, it turns out that a two-path ultrasonic meter with this path layout shows considerable errors in flow velocity measurement of wet gases.

It is also known that the error characteristic in dependence of the flow rate is almost flat at a distance of 0.6 R to the central longitudinal axis. At the same time, this flat characteristic comes at the price of higher absolute approximation error. This knowledge has never been connected to two-path ultrasonic meters. Conventional two-path meters stick to the 0.5 R position where the error is minimal.

It is therefore the object of the invention to find an ultrasonic measurement device that can be used as a substitute of orifice meters, in particular in upstream applications.

This object is satisfied by an ultrasonic measurement device in accordance with claim 1 and a method for determining a flow velocity in accordance with claim 12. The invention starts from the basic idea to use ultrasonic meters in applications where a multitude of measurement paths is not an option due to costs. Therefore, a two-path meter is chosen. For upstream applications, it has to maintain its precision even under rough conditions. To that end, the position of the measurement paths is adapted, and they are distanced from the central longitudinal axis by more than half a radius R of the piping in contrast to the prior art.

The invention has the advantage that upstream applications can be solved with an ultrasonic meter. By using a two-path configuration, costs remain moderate. At the same time, the precision of the measurement is maintained regardless of the environment. The device is tolerant against liquids, i.e. the measurement errors are basically the same in a dry gas and a wet gas up to a considerable liquid portion. Most, if not all disadvantages of orifice meters as discussed above can be avoided. The path layout with its robustness to different flows also allows to simply "dry" calibrate the device with air rather than under high gas pressure.

Typical nominal diameters for upstream applications are two, three, four, or six inches. While these specifications typically relate to the diameter, the measurement path layout is given in units of the radius. Since diameter and radius are the same except for a factor of two, this is merely a language convention. Having large measurement dynamics, the same ultrasonic meter designed for a certain nominal diameter is able to replace orifice meters of two or three different nominal diameters.

The geometric layout refers to a central horizontal plane. This horizontal reference plane, containing the central longitudinal axis, cuts the pipe section into an upper and a lower half. Of course, one could rotate the pipe section upon mounting, and then the horizontal reference plane will no longer be horizontal. Tilting the ultrasonic measurement device is possible within the scope of the invention, but results in an inferior path layout.

The first path and the second path are preferably parallel to each other and/or have the same distance to the horizontal reference plane and/or are symmetric with respect to the horizontal reference plane with one path above and the other path below the horizontal reference plane. These path layout properties are suitable to obtain a reliable approximation of the fluid flow, in particular for wet gases.

The distance from the paths to the horizontal reference plane is preferably smaller than 0.7 in units of the radius, in particular within the interval [0.55, 0.65] in units of the radius. These path distances approach the theoretical distance of 0.6 in units of the radius, where theory predicts a flat error characteristic. Within the interval ]0.5,0.6], one can expect to trade absolute error for more independence from the Reynold's number of the flow. This makes the measurement robust, in particular for wet gases.

More preferably, the distance from the paths to the horizontal reference plane is basically 0.6 in units of the radius. Basically means that a tolerance of 5%, 3%, 1% or even less than <1% is allowable. The 0.6 R position maximizes independence from disturbances in the flow. At the same time, the paths are still near enough the conventional 0.5 R position, keeping the approximation error at a tolerable level. Experiments show that the characteristic in air is flat with only minimal dependence on the Reynold's number of the flow.

The ultrasonic transducers are preferably mounted to the pipe section flush with the inner wall of the pipe or slightly recessed. Conventionally, the transducers are mounted to extend into the fluid flow. A flush mounting increases reproducibility of the flow and, hence, independence of the measurement results from Reynold's number. Another advantage is that the transducers are safe from erosion in their flush position.

Preferably, the pipe section comprises bores for mounting the ultrasonic transducers, the bores being larger in diameter than the ultrasonic transducers by a factor of 1.5 or more to form pockets in the inner wall of the pipe. One example would be a 8 mm diameter of the transducer and a diameter of 18 mm of the bore. For comparison, a conventional bore would be 10 mm in diameter. The enlarged bores give rise to pockets in the inner wall of the piping. Liquids will flow off instead of aggregating, or where liquids are aggregated, they will do so with less effect on the flow.

The pipe section preferably comprises an integral upstream feed portion with a longitudinal extension of at least 10 in units of the radius, in particular of at least 20. The feed portion guarantees that, upon mounting of the measurement device, there is sufficient upstream piping to calm down and homogenize the flow. At the same time, there is no need of flanges for mounting the feed piping that are also potential leakages because the feed portion is an integral part of the device. A typical length of the upstream feed would be five or ten diameters. The feed portion can be a simple pipe with thick walls, rather than a cast or forged part as often used conventionally.

The feed portion preferably comprises a flow conditioner. Two distinct effects of a flow conditioner are to be discussed. Firstly, the length of an upstream feed portion can be reduced, that is the distance to where a first bending or other disturbance of the flow could be located upstream. The invention can make advantageous use of a flow conditioner for that effect. Secondly, the flow conditioner could make the measurement more tolerant against the liquid portion of a wet gas. While this seems to be the case for orifice meters, the invention surprisingly does not need a flow conditioner to be tolerant against liquid.

The integration means are preferably capable of detecting an unreliable path or breakdown of a path by comparison of the first flow velocity value and the second flow velocity with a default value or with each other. In contrast to a conventional orifice meter, the device according to the invention is able to detect faulty conditions and to warn the user. With increasing liquid portion, differences of the first flow velocity and the second flow velocity become more distinct, with the extreme of the lower measurement path breaking down due to the liquid.

The integration means preferably use an alternate flow velocity value instead of the flow velocity value when detecting a lack of reliability or a breakdown of a path, the alternate flow velocity value being a default value or the rescaled flow velocity value of the other path of the first two-path measurement system. This is an easy way of temporarily replacing a faulty measurement path. The approximation of the flow can still be calculated in the same way. The alternate flow velocity can be a default value. It is more flexible and precise to rescale the flow velocity value of the path still functioning, the factor being a theoretical value or a factor that is adapted during previous operation of both paths.

The ultrasonic measurement device preferably comprises
  a second two-path measurement system with a third path and a fourth path defined by a third pair of ultrasonic transducers and a fourth pair of ultrasonic transducers mounted to the wall of the pipe section, the ultrasonic transducers of each path opposing each other at the ends of their path, the third path and the fourth path being mirror images of the first path and the second path with respect to a vertical reference plane defined by the central longitudinal axis;
  second evaluation means to determine a third flow velocity value from the third path by comparing the ultrasonic transit times along the third path with and against the fluid flow and a fourth flow velocity value from the fourth path by comparing the ultrasonic transit times along the fourth path with and against the fluid flow;
  second integration means to determine the flow velocity from the third flow velocity value and the fourth flow velocity value; and
  correction means to compare the flow velocities of the first two-path measurement system and the second two-path measurement system, or to correct the flow velocity based on the flow velocities determined from both two-path measurement systems.

In this embodiment, a second two-path meter is provided that is the mirror of the first two-path meter. It can be used merely for redundancy or for comparison of the results of both two-path meters. Alternatively, it is used to calculate the flow velocity from all four paths in a kind of four-path meter with a special path layout. According to this path layout, all paths are at the same distance from the horizontal reference plane, with two respective paths in the upper half and two paths in the lower half of the pipe section forming an X. With this design, influence of a transversal flow is integrated into the approximation. Any details and advantaged discussed in the context of the first, unique two-path meter of the other embodiments can also be applied to the second two-path meter of this embodiment with a double two-path meter.

The method in accordance with the invention can be further developed in a similar manner and shows similar advantages. Such advantageous features are described in an exemplary, but not exclusive manner in the subordinate claims dependent on the independent claims.

Figure 1:
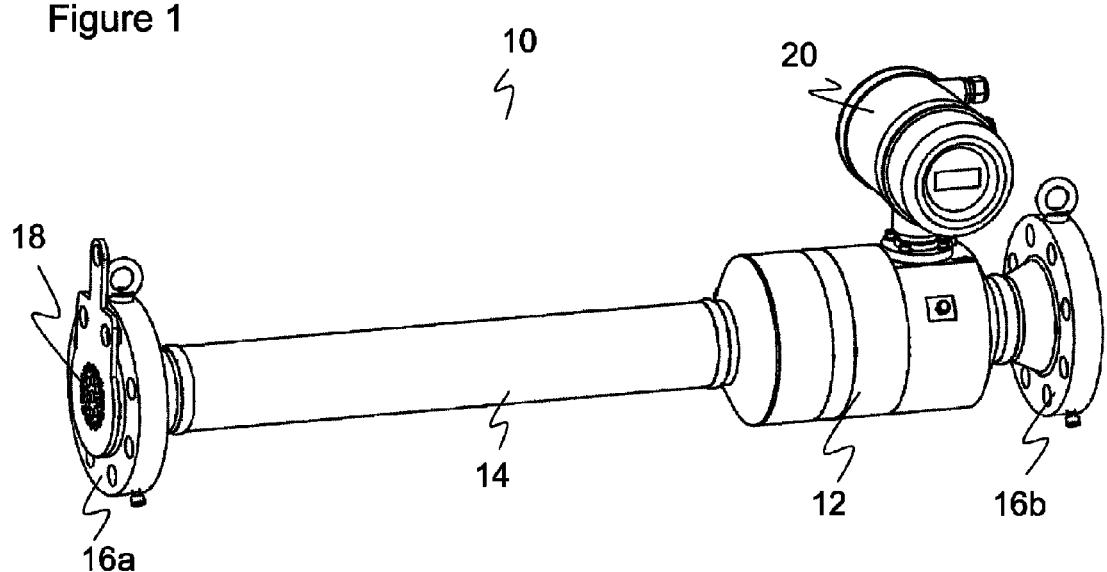
Figure 2:
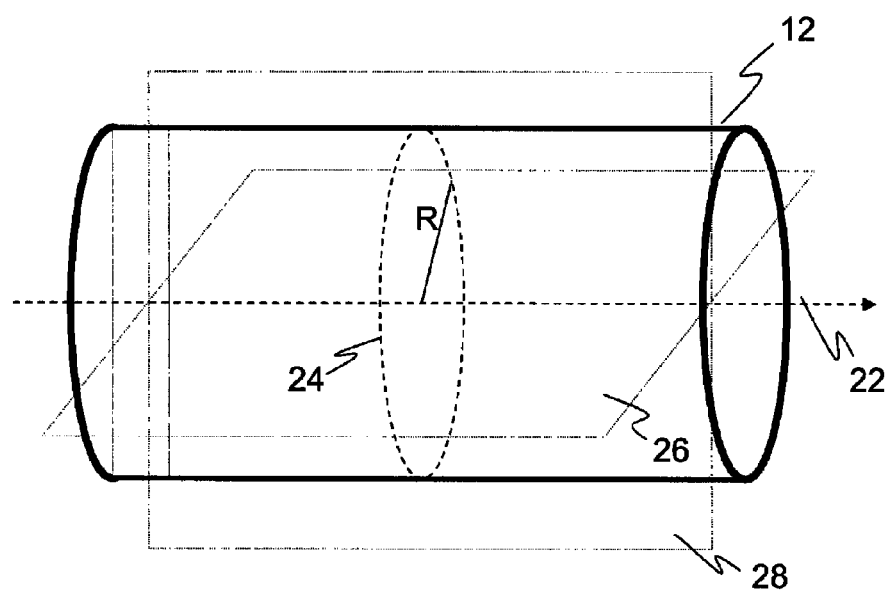
Figure 3:
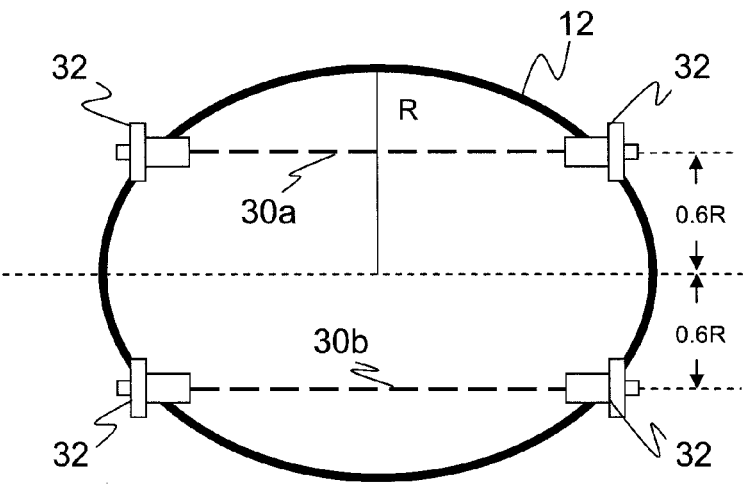
Figure 4A:
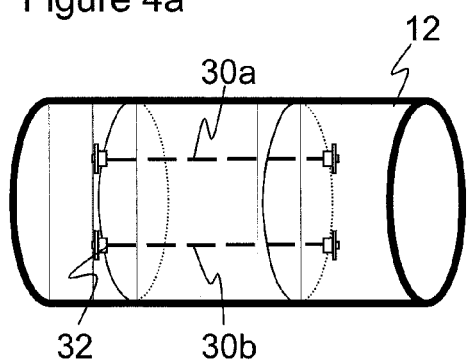
Figure 5A:
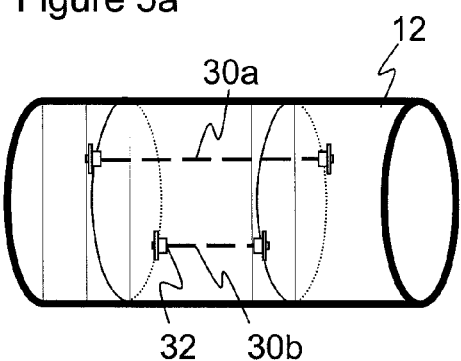
Figure 4B:
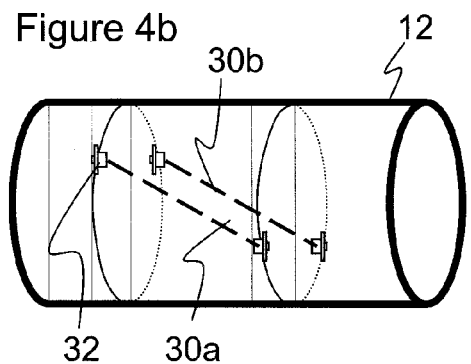
Figure 5B:
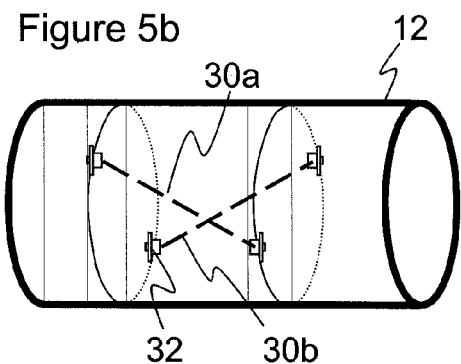
Figure 6:
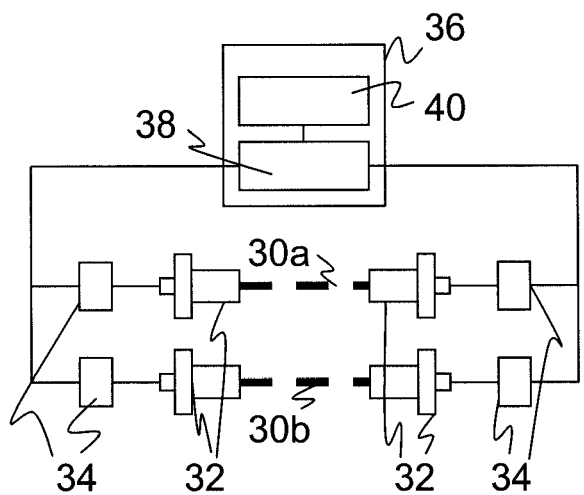
Figure 7A:
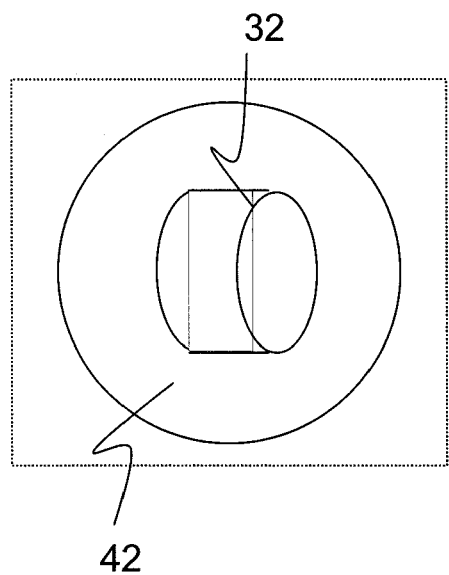
Figure 7B:
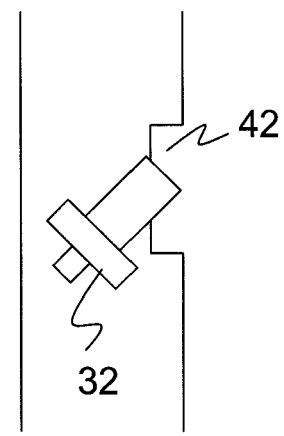
Figure 8A:
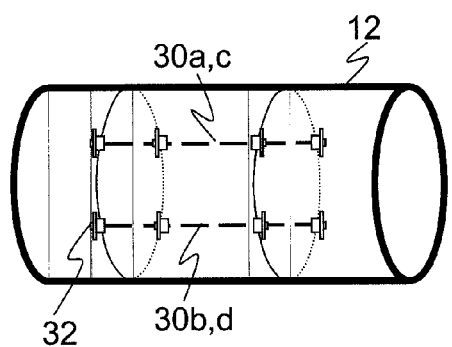
Figure 8B:
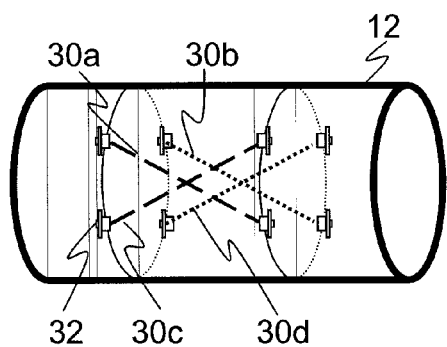
Figure 9:
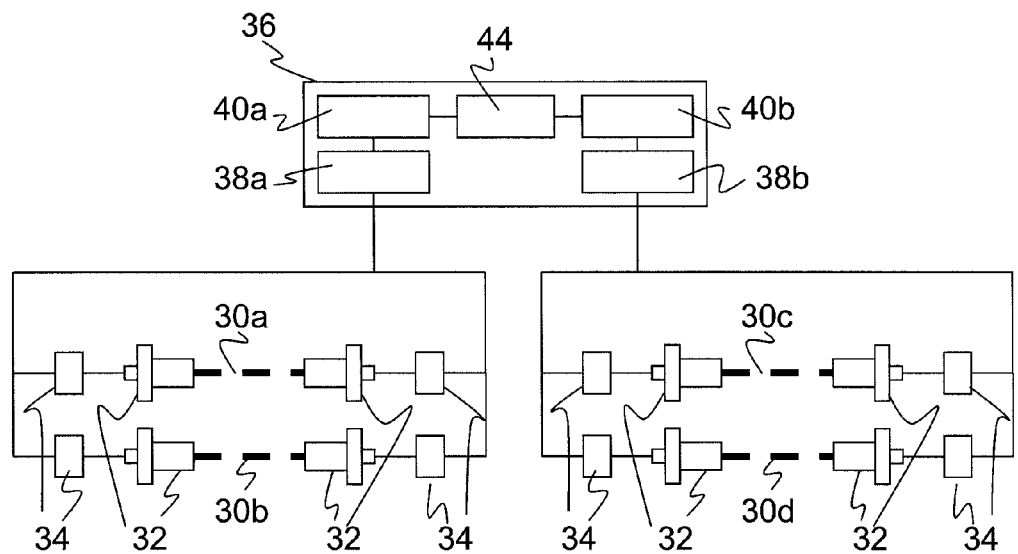
Figure 10A:
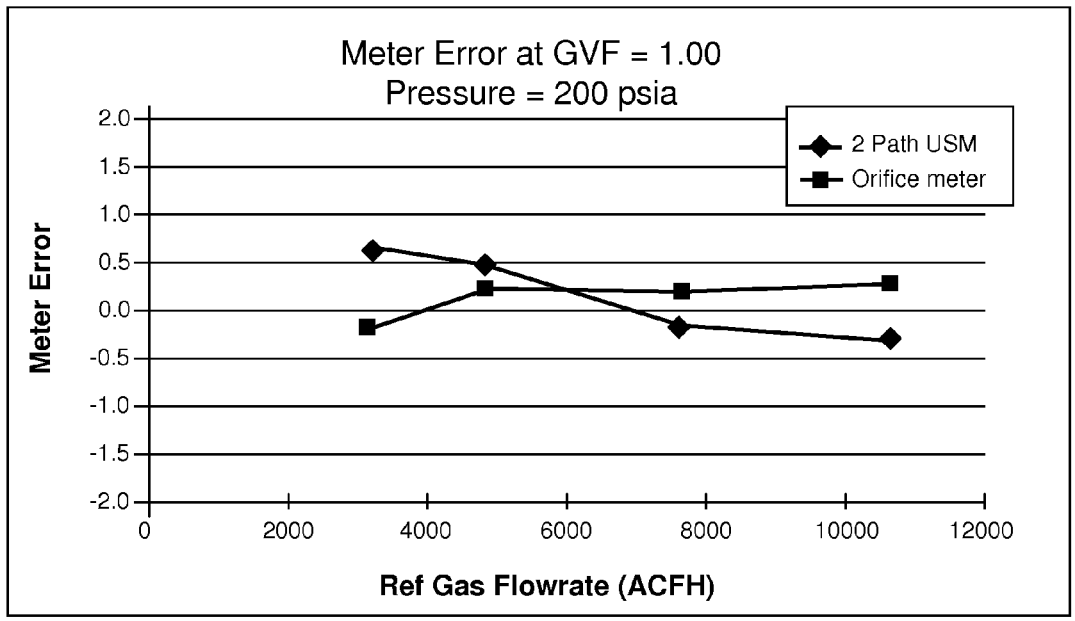
Figure 10B:
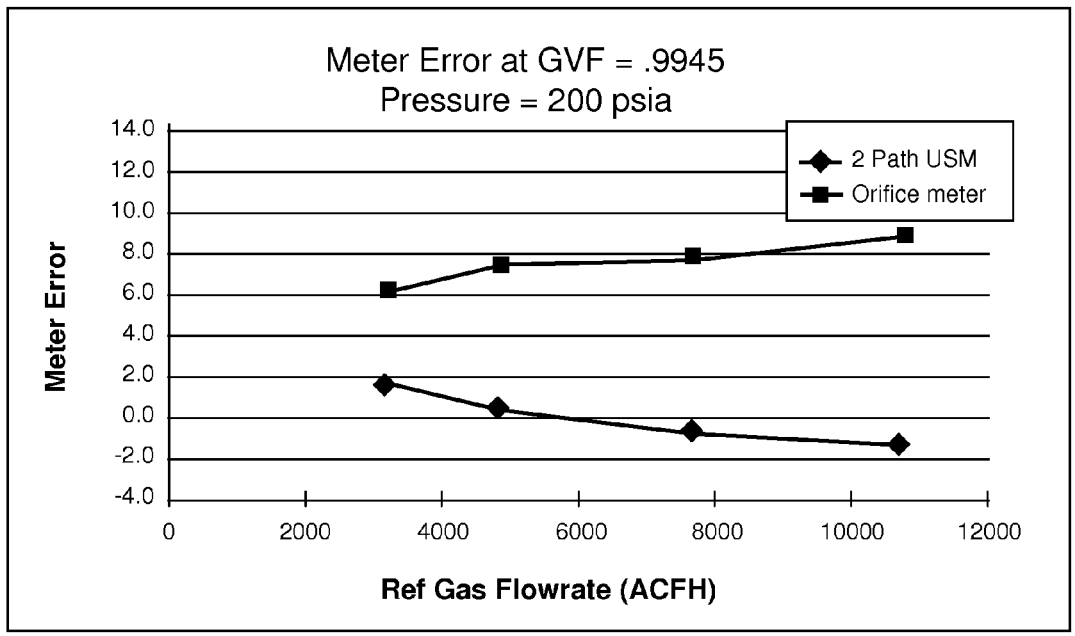

The invention will be explained in more detail in the following also with respect to further features and advantages by way of example with reference to embodiments and to the enclosed drawing. The Figures of the drawing show in:

FIG. 1 a perspective view of an ultrasonic measurement device according to the invention;

FIG. 2 a schematic perspective view of a pipe section to explain geometric definitions and parameters;

FIG. 3 a cross section of a pipe section to explain the path layout and the path distance from a horizontal reference plane introduced in FIG. 2;

FIG. 4a-b a front and top view of a pipe section to illustrate the path layout in an embodiment of the invention with parallel paths;

FIG. 5a-b a front and top view of a pipe section to illustrate the path layout in another embodiment of the invention with transversal paths;

FIG. 6 a block diagram of the components of an ultrasonic measurement device according to the invention;

FIG. 7a a plan view of the inner wall of a pipe section to illustrate the mounting of ultrasonic transducers in large bore forming a pocket;

FIG. 7b a cross section of the inner wall and transducer according to FIG. 7a;

FIG. 8a-b a front and top view of a pipe section to illustrate the path layout in an embodiment of the invention with an additional two-path-measurement system;

FIG. 9 a block diagram of the components of an ultrasonic measurement device with the path layout of FIG. 8;

FIG. 10a a comparison of the measurement error in dependence of the gas flow rate for a conventional orifice meter and the invention for a dry gas;

FIG. 10b a diagram according to FIG. 10b for a wet gas; and

FIG. 11 a top view on an ultrasonic measurement path to explain the conventional ultrasonic transit time difference principle.

FIG. 1 shows a perspective view of an ultrasonic measurement device 10 according to an embodiment of the invention. The device 10 comprises a pipe section 12 with an ultrasonic measurement cell, an elongated feed portion 14 and two flanges 16a-b for mounting of the device 10 into a piping. The feed portion 14 has a length that corresponds to about 10 diameters of the piping and is formed integral with the pipe section 12. An optional flow conditioner 18 is provided at the inlet of the feed portion 14. As an alternative that is not shown, the feed portion 14 can be omitted when the required upstream portion of extended piping is provided at the place of mounting.

Within the pipe section 12, ultrasonic transducers measure the flow velocity of a fluid flowing in the piping, in particular a dry gas or a wet gas containing a liquid. The liquid is an unwanted, but unavoidable admixture, for example oil or water, forming a two-phase flow with the gas that is the real target of the measurement. The signals of the ultrasonic transducers are evaluated in an evaluation section 20, where the flow velocity is calculated, displayed and/or output to an external control. The section 20 can also be used to display or output diagnostic information. Possible diagnosis include the detection of liquid in the flow or the fact that no reliable flow velocity can be determined because the liquid phase is too strong.

FIG. 2 is a schematic perspective view of the geometry of the pipe section 12. The piping is preferably axially symmetric to a central longitudinal axis 22 that also illustrates the direction of the flow. The pipe section 12 has a cross section 24 with a radius R. A horizontal reference plane 26 containing the central longitudinal axis 22 cuts the pipe section 12 into an upper half and a lower half. The plane orthogonal to the horizontal reference plane 26 and containing the central longitudinal axis 22 is termed the vertical reference plane 28. Obviously, if one chooses to mount the pipe section 12 with a rotation transverse to the central longitudinal axis 22, planes 26, 28 will have a tilt.

FIG. 3 shows a cross section of the pipe section 12. Unlike cross section 24 of FIG. 2, this cross section is not orthogonal, but oriented at an angle to contain two measurement paths 30a-b of two pairs of ultrasonic transducers 32. Since the measurement paths 30a-b have a component both with the flow and transverse to the flow, the cross section is not orthogonal and has an elliptic form. Each measurement path 30a-b is used and evaluated as described in the introduction with reference to FIG. 11 to obtain a flow velocity value for the respective path 30a-b.

As illustrated, measurement paths 30a-b are distanced by 0.6 R with respect to the horizontal reference plane 26. The position can have a tolerance and can also be varied in alternative embodiments within an interval of, for example, ]0.5, 0.7] or [0.55, 0.65]. In all these embodiments, the distance is greater than 0.5 R in contrast to the conventional path layout and contrary to the conventional approach to minimize the absolute error. Although at 0.6 R the absolute error is larger, the error shows a flat characteristic in dependence of the Reynold's number or the flow rate. This is one factor that makes the measurement more robust with a wet gas flow.

An embodiment of the invention satisfying the distance condition of FIG. 3 is shown in FIG. 4a in a front view and in FIG. 4b in a top view. Paths 30a-b are parallel to each other and the horizontal reference plane 26, the latter being a symmetry plane. As a variant as shown in FIG. 5, paths 30a-b can also form an X in the top view of FIG. 5b.

The configuration of the ultrasonic measurement device 10 is shown in FIG. 6 in a schematic block diagram of its components. The ultrasonic transducers 32 mounted at the ends of their respective measurement paths 30a-b are connected to control circuits 34 to alternately send and receive ultrasonic signals. The control circuits 34 may include amplifiers, analog digital converters and similar elements to preprocess the signals.

An evaluation unit 36 is connected to all ultrasonic transducers 32 via the control circuits 34. The evaluation unit 36 comprises evaluation means 38 to calculate a flow velocity value for each of the paths 30a-b. The evaluation means 38 basically implement the conventional ultrasonic transit time principle as illustrated in FIG. 11. Moreover, the evaluation unit 36 comprises integration means 40 receiving the flow velocity values for all the paths 30a-b from the evaluation means 38 and determining the flow velocity approximation for the whole cross section 24 from that.

FIG. 7 shows how an ultrasonic transducer 32 is mounted to the inner wall of the pipe section 12, where FIG. 7a is a plan view and FIG. 7b a section of the inner wall. Bores 42 are considerably larger than the ultrasonic transducer 32, for example by a factor of 1.5 or more. Therefore, pockets are formed where liquid contained in the fluid cannot aggregate in a manner detrimental to a reproducible flow. The ultrasonic transducer 32 is also mounted flush (or slightly recessed) with the inner wall rather than extending into the flow. This prevents erosion and again minimizes effects on the flow. The ultrasonic transducers 32 are preferably made of titanium and hermetically sealed against the flow to avoid possible damages of the ultrasonic transducers 32.

FIG. 8a in a front view and FIG. 8b in a plan view show another embodiment of the invention with an additional two-path measurement system, resulting in four measurement paths 30a-d in total. The additional paths 30b,d are mirror images of the original paths 30a,c with respect to the vertical reference plane 28. Consequently, there results a double X configuration with all paths 30a-d having the 0.6 R distance from the horizontal reference plane 26.

FIG. 9 shows the corresponding configuration of an ultrasonic measurement device 10 for this path layout. The main difference to FIG. 6 is that the components 32, 34, 38, 40 are doubled to support the additional two measurement paths 30c-d. Moreover, correction means 44 are included in the evaluation unit 36 to compare or correct the two flow velocities as calculated by the integration means 40a and 40b, respectively. The configuration of FIG. 9 rather straightforwardly incorporates two additional paths 30c-d. This is especially suitable to arrive at a redundant system. It is also possible to adapt the evaluation means, e.g. by having only one instance of evaluation means 38 capable of determining a flow velocity value for all paths 30a-d. These flow velocity values could be fed to a single combined integration and correction means to obtain the overall flow velocity.

FIG. 10 illustrates the advantageous effect of the invention by a comparison of a conventional orifice meter with the inventive ultrasonic measurement device 10. FIG. 10a shows the meter error in dependence of the gas flow rate for a dry gas. The characteristic remains almost flat in both instances, thus there is no noticeable affect in performance.

FIG. 10b shows the meter errors for a wet gas containing a liquid phase at a GVF (gas volume faction, a kind of complement of the liquid phase) of 0.9945. The errors of the orifice meter are significantly increased, while the errors of the inventive two-path ultrasonic measurement device 10 are more or less the same as in FIG. 10a with dry gas.

As a summary, several measures are taken to improve a two-path ultrasonic meter for an optimized performance in upstream applications, in particular the measurement of wet gas. While the liquid phase leads to massively increasing errors in conventional orifice meters, these measures make the inventive ultrasonic measurement device 10 robust and tolerant against liquids. As a further advantage, the diagnostics are improved, displaying presence of a liquid and situations where the liquid prevents precise measurement. One important measure is to increase the distance of the paths 30a-d from the conventional 0.5 R, in particular to a position at 0.6 R. Another measure is to have greater bores 42 and the ultrasonic transducers 32 flush with the inner wall of the pipe section. Still another measure is to integrate the elongated feed portion 14 to make sure that the flow is sufficiently smoothed and homogenized to obtain reproducible measurement results.

The invention claimed is:

1. An ultrasonic measurement device (10) for determining a flow velocity of a fluid in a conduit, comprising:
    a pipe section (12) having a central longitudinal axis (22) and a cross section (24) with a radius (R), the central longitudinal axis (22) defining a horizontal reference plane (26);
    a two-path measurement system comprising a first path (30a) and a second path (30b) defined by a first pair of ultrasonic transducers (32) and a second pair of ultrasonic transducers (32) mounted to the wall of the pipe section (12), the ultrasonic transducers (32) of each path (30a-b) opposing each other at the ends of their path (30a-b), each path (30a-b) oriented parallel to the horizontal reference plane (26) with a distance to the horizontal reference plane (26) while having a component transverse to the central 15 longitudinal axis (22);
    first evaluation means (38) to determine a first flow velocity value from the first path (30a) by comparing the ultrasonic transit times along the first path (30a) with and against the fluid flow and a second flow velocity value from the second path (30b) by comparing the ultrasonic transit times along the 20 second path (30b) with and against the fluid flow; and
    first integration means (40) to determine the flow velocity from the first flow velocity value and the second flow velocity value,
wherein the distance from the paths (30a-b) to the horizontal reference plane (26) is greater than half the radius (R).

2. The ultrasonic measurement device (10) according to claim 1, wherein the first path (30a) and the second path (30b) are parallel to each other and/or have the same distance to the horizontal reference plane (26) and/or are symmetric with respect to the horizontal reference plane (26) with one path (30a) above and the other path (30b) below the horizontal reference plane (26).

3. The ultrasonic measurement device (10) according to claim 1, wherein the distance from the paths (30a-b) to the horizontal reference plane (26) is smaller than 0.7 in units of the radius (R), in particular within the interval [0.55, 0.65] in units of the radius (R).

4. The ultrasonic measurement device (10) according to claim 1, wherein the distance from the paths (30a-b) to the horizontal reference plane (26) is basically 0.6 in units of the radius (R).

5. The ultrasonic measurement device (10) according to claim 1, wherein the ultrasonic transducers (32) are mounted to the pipe section (12) flush with the inner wall of the pipe section (12) or slightly recessed.

6. The ultrasonic measurement device (10) according to claim 1, wherein the pipe section (12) comprises bores (42) for mounting the ultrasonic transducers (32), the bores (42) being larger in diameter than the ultrasonic transducers (32) by a factor of 1.5 or more to form pockets in the inner wall of the pipe section (12).

7. The ultrasonic measurement device (10) according to claim 1, wherein the pipe section (12) comprises an integral upstream feed portion (14) with a longitudinal extension of at least 10 in units of the radius (R), in particular of at least 20.

8. The ultrasonic measurement device (10) according to claim 7, wherein the feed portion (14) comprises a flow conditioner (18).

9. The ultrasonic measurement device (10) according to claim 1, wherein the integration means (40) are capable of detecting an unreliable path (30*a-b*) or breakdown of a path (30*a-b*) by comparison of the first flow velocity value and the second flow velocity with a default value or with each other.

10. The ultrasonic measurement device (10) according to claim 9, wherein the integration means (40) use an alternate flow velocity value instead of the flow velocity value when detecting a lack of reliability or a breakdown of a path (30*a-b*), the alternate flow velocity value being a default value or the rescaled flow velocity value of the other path (30*a-b*) of the first two-path measurement system.

11. The ultrasonic measurement device (10) according to claim 1, comprising:
    a second two-path measurement system with a third path (30*c*) and a fourth path (30*d*) defined by a third pair of ultrasonic transducers (32) and a fourth pair of ultrasonic transducers (32) mounted to the wall of the pipe section (12), the ultrasonic transducers (32) of each path opposing each other at the ends of their path (30*c-d*), the third path (30*c*) and the fourth path (30*d*) being mirror images of the first path (30*a*) and the second path (30*d*) with respect to a vertical reference plane (28) defined by the central longitudinal axis (22);
    second evaluation means (38*b*) to determine a third flow velocity value from the third path (30*c*) by comparing the ultrasonic transit times along the third path (30*c*) with and against the fluid flow and a fourth flow velocity value from the fourth path (30*d*) by comparing the ultrasonic transit times along the fourth path (30*d*) with and against the fluid flow;
    second integration means (40*b*) to determine the flow velocity from the third flow velocity value and the fourth flow velocity value; and
    correction means (44) to compare the flow velocities of the first two-path measurement system and the second two-path measurement system, or to correct the flow velocity based on the flow velocities determined from both two-path measurement systems.

12. A method for determining a flow velocity of a fluid in a conduit having a central longitudinal axis (22) and a cross section (24) with a radius (R), the central longitudinal axis (22) defining a horizontal reference plane (26), the method comprising the steps of:
    sending ultrasonic signals along a two-path measurement system comprising a first path (30*a*) and a second path (30*b*) in a direction with and against the fluid flow, each path (30*a-b*) oriented parallel to the horizontal reference plane (26) with a distance to the horizontal reference plane (26) while having a component transverse to the central longitudinal axis (22);
    determining a first flow velocity value from the first path (30*a*) by comparing the ultrasonic transit times along the first path (30*a*) with and against the fluid flow and a second flow velocity value from the second path (30*b*) by comparing the ultrasonic transit times along the second path (30*b*) with and against the fluid flow; and
    determining the flow velocity by approximation of the flow through the cross section (24) based on the first flow velocity value and the second flow velocity value, wherein the ultrasonic signals are sent along paths (30*a-b*) with the distance to the horizontal reference plane (26) being greater than half the radius (R).

13. The method according to claim 12, wherein the ultrasonic signals are sent along paths (30*a-b*) with the distance to the horizontal reference plane (26) being smaller than 0.7, in particular being within the interval [0.55, 0.65] or being essentially 0.6 in units of the radius (R).

14. The method according to claim 12, wherein an unreliable path (30*a-b*) or breakdown of a path (30*a-b*) is detected by comparison of the first flow velocity value and the second flow velocity with a default value or with each other.

15. The method according to claim 14, wherein an alternate flow velocity value is used instead of the flow velocity value when a lack of reliability or a breakdown of a path (30*a-b*) is detected, the alternate flow velocity value being a default value or the rescaled flow velocity value of the other path (30*a-b*).

\* \* \* \* \*